US008294060B2

(12) United States Patent
Mohanty et al.

(10) Patent No.: US 8,294,060 B2
(45) Date of Patent: Oct. 23, 2012

(54) IN-SITU PLASMA/LASER HYBRID SCHEME

(75) Inventors: Pravansu S. Mohanty, Canton, MI (US); Nicholas Anton Moroz, Northville, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 354 days.

(21) Appl. No.: 12/772,342

(22) Filed: May 3, 2010

(65) Prior Publication Data

US 2010/0320176 A1 Dec. 23, 2010

Related U.S. Application Data

(60) Provisional application No. 61/174,576, filed on May 1, 2009, provisional application No. 61/233,863, filed on Aug. 14, 2009.

(51) Int. Cl.
*B23K 9/00* (2006.01)

(52) U.S. Cl. .................................................. 219/121.37

(58) Field of Classification Search ............. 219/121.37, 219/121.47, 76.16, 121.16, 121.65, 121.36, 219/121.5, 121.52, 121.56, 121.57, 121.48, 219/121.51

See application file for complete search history.

(56) References Cited

U.S. PATENT DOCUMENTS

| | | | | |
|---|---|---|---|---|
| 5,298,714 | A | 3/1994 | Szente et al. | |
| 7,750,265 | B2 * | 7/2010 | Belashchenko | 219/121.47 |
| 2002/0172871 | A1 | 11/2002 | Schucker | |
| 2003/0047617 | A1 | 3/2003 | Shanmugham et al. | |
| 2007/0264564 | A1 | 11/2007 | Johnson et al. | |
| 2008/0057212 | A1 * | 3/2008 | Dorier et al. | 427/446 |
| 2010/0034979 | A1 * | 2/2010 | Barykin | 427/446 |
| 2010/0136249 | A1 * | 6/2010 | Deng et al. | 427/453 |

FOREIGN PATENT DOCUMENTS

| | | | |
|---|---|---|---|
| JP | 06-272012 | A | 9/1994 |
| JP | 07-316774 | A | 12/1995 |
| JP | 08-243756 | A | 9/1996 |
| JP | 2002145615 | | 5/2002 |

OTHER PUBLICATIONS

International Search Report and Written Opinion in Corresponding International Patent Application PCT/US2010/033383 dated Nov. 26, 2010.

International Search Report and Written Opinion in Corresponding PCT International Application No. PCT/US2010/045431 Dated Apr. 28, 2011.

* cited by examiner

*Primary Examiner* — Steven Loke
*Assistant Examiner* — Tram H Nguyen
(74) *Attorney, Agent, or Firm* — Harness, Dickey & Pierce, P.L.C.

(57) ABSTRACT

A method and apparatus for forming layers on a target. The apparatus and method employ a direct current plasma apparatus to form at least one layer using a plasma jet containing precursors. In some embodiments, the direct current plasma apparatus utilizes axial injection of the precursors through the cathode (in an upstream and/or downstream configuration) and/or downstream of the anode. In some embodiments, the direct current plasma apparatus can comprise a laser source for remelting the layer using a laser beam to achieve in-situ densification thereof.

16 Claims, 17 Drawing Sheets

IN-SITU PLASMA/LASER HYBRID SCHEME

CROSS-REFERENCE TO RELATED APPLICATIONS

This application claims the benefit of U.S. Provisional Application No. 61/174,576, filed on May 1, 2009 and U.S. Provisional Application No. 61/233,863, filed on Aug. 14, 2009. The entire disclosures of each of the above applications are incorporated herein by reference.

GOVERNMENT INTEREST

This invention was made with government support under Grant No. N00244-07-P-0553 awarded by the U.S. Navy. The government has certain rights in the invention

FIELD

The present disclosure relates to direct current (DC) plasma processing and, more particularly, relates to a modified direct current plasma apparatus and methods for improved coating results using direct current plasma processing.

BACKGROUND AND SUMMARY

This section provides background information related to the present disclosure which is not necessarily prior art. This section provides a general summary of the disclosure, and is not a comprehensive disclosure of its full scope or all of its features.

In plasma spray processing, the material to be deposited (also known as feedstock)—typically as a powder, a liquid, a liquid suspension, or the like—is introduced into a plasma jet emanating from a plasma torch or gun. In the jet, where the temperature is on the order of 10,000 K, the material is melted and propelled towards a substrate. There, the molten/semi-molten droplets flatten, rapidly solidify and form a deposit and, if sufficient in number, a final layer. Commonly, the deposits remain adherent to the substrate as coatings, although free-standing parts can also be produced by removing the substrate. Direct current (DC) plasma processing and coating is often used in many industrial technology applications.

With particular reference to FIG. 1, a schematic of a conventional apparatus for conducting direct current plasma processing (FIG. 1(*a*)), as well as a photograph of the apparatus in operation (FIG. 1(*b*)), are provided. A conventional direct current plasma apparatus 100 generally comprises a housing 110 having a cathode 112 (which is negatively charged) and an anode 114 (which is positively charged). A plasma gas is introduced along an annular pathway 116 to a position downstream of cathode 112 and generally adjacent anode 114. An electrical arc is established and it extends from the cathode 112 to the anode 114 and generates the plasma gas to form a hot gas jet 118. Generally, this electrical arc rotates on the annular surface of the anode 114 to distribute the heat load. A precursor 120, such as in the form of a powder or a liquid, is fed from a position downstream of anode 114 and external to the plasma jet 118 into the jet boundary. This process is generally referred to as radial injection. The powders (solid) and/or droplets (liquid) within the precursor 120 are typically entrained into the plasma jet 118 and travel with it, eventually melting, impacting, and being deposited on a desired target. The powders are typically presynthesized by another process into a predetermined chemistry and solidified form and are typically sized on the order of microns.

Generally, the liquid droplets are typically of two types—namely, a first type where the liquid droplets contain very fine powders (or particles), which are presynthesized by another process into solid form being of submicron or nanometer size, suspended in a liquid carrier; and a second type where liquid droplets contain a chemical dissolved in a solvent, wherein the chemical eventually forms the final desired coating material.

In the first type, during deposition, the liquid droplets are entrained in the plasma jet 118, causing the liquid carrier to evaporate and the fine particles to melt. The entrained melted particles then impact on a target, thereby forming the coating. This approach is also known as "suspension approach".

In the second type, as droplets travel in the plasma jet 118 a chemical reaction takes place along with the evaporation of the liquid solvent to form the desired solid particles which again melt and upon impact on the target form the coating. This approach is known as "solution approach".

Generally speaking, the solid powder injection approach is used to form microcrystalline coatings, and both of the liquid approaches are used to form nanostructured coatings.

However, direct current plasma processing suffers from a number of disadvantages. For example, because of the radial injection method used in DC plasma processing, the precursor materials are typically exposed to different temperature history or profiles as they travel with the plasma jet. The core of the plasma jet is hotter than the outer boundaries or periphery of the plasma jet, such that the particles that get dragged into the center of the jet experience the maximum temperature. Similarly, the particles that travel along the periphery experience the lowest temperature. As seen in FIG. 2, a simulation of this phenomenon is illustrated. Specifically, the darker particles 130 are cooler, as illustrated by the gray scale, and travel generally along the top portion of the exemplary spray pattern in the figure. The lighter particles 132 are hotter, again as illustrated by the gray scale, and travel generally along the bottom portion of the exemplary spray pattern in the figure. This temperature non-uniformity of powder or droplets affects the coating quality negatively. This variation is especially disadvantageous in liquid-based techniques, which are typically used for nanomaterial synthesis.

Additionally, due to the radial injection orientation (see FIGS. 1(*a*)-1(*b*)), the entrained particles typically achieve a lower velocity due to the need to change direction within the jet from a radial direction (during introduction in the Y-axis) to an axial direction (during entrainment in the X-axis) and the associated inertias. This negatively affects the coating density and the deposition efficiency (i.e. amount of material injected compared to the amount that adheres to the target). Particularly, this is important for nanoparticle deposition as they need to achieve a critical velocity to impact upon the target forming the coating, lack of which would cause them to follow the gas jet and escape the target.

Further, the interaction time of the particle (related to the amount of heat that can be absorbed by the particle) with the jet 118 is shorter due to external injection and, thus, very high melting point materials that must achieve a higher temperature before becoming molten can not be melted by external injection due to the reduced residence time in the jet 118. Similarly, in the case of liquid precursors, lack of appropriate heating leads to unconverted/unmelted material resulting in undesirable coating structures as illustrated in FIG. 22.

Furthermore, the coatings typically achieved with conventional direct current plasma processing suffer from additional disadvantages in that as individual molten or semi-molten particles impact a target, they often retain their boundaries in the solidified structure, as illustrated in FIG. 3. That is, as each particle impacts and is deposited upon a target, it forms a singular mass. As a plurality of particles are sequentially deposited on the target, each individual mass stacks upon the others, thereby forming a collective mass having columnar grains and lamellar pores disposed along grain boundaries. These boundary characteristics and regions often lead to problems in the resultant coating and a suboptimal layer. These compromised coatings are particularly undesired in biomedical, optical and electrical applications (i.e. solar and fuel cell electrolytes).

Therefore, a need exists in the art for reliable ways to inject precursor material (either solid powder or liquid droplet or gaseous) axially within a jet 118 (i.e, in the same direction of the jet) to achieve improved coating results.

Accordingly, the present teachings provide a system for axial injection of a precursor in a modified direct current plasma apparatus. According to the principles of the present teachings, precursor can be injected through the cathode and/or through an axial injector sitting in front of the anode rather than radially injected as described in the prior art. The principles of these teachings have permitted formulation and the associated achievement of certain characteristics that have application in a wide variety of industries and products, such as battery manufacturing, solar cells, fuel cells, and many other areas.

Still further, according to the principles of the present teachings, in some embodiments, the modified direct current plasma apparatus can comprise a laser beam to provide an in-situ hybrid apparatus capable of producing a plurality of coating types. These in-situ modified coatings have particular utility in a wide variety of applications, such as optical, electrical, solar, biomedical, and fuel cells. Additionally, according to the principles of the present teachings, the in-situ hybrid apparatus can fabricate free standing objects comprising different materials such as optical lenses made using complex optical compounds and their combinations.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1(*b*) is a photograph of a conventional direct current plasma system during operation;

Figure 7:
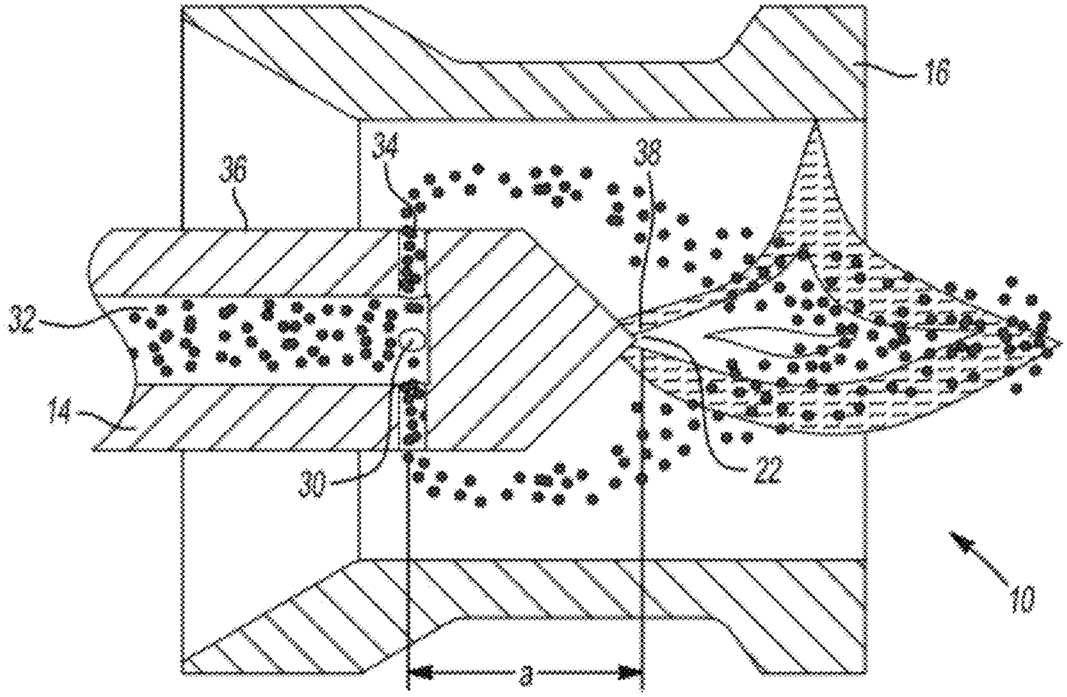
Figure 8:
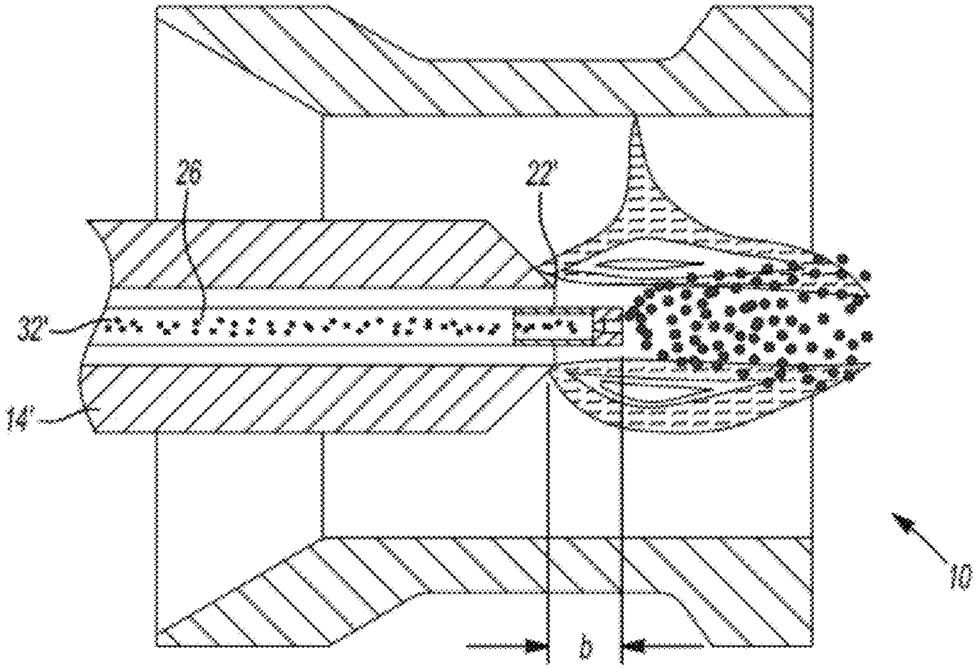
Figure 11:
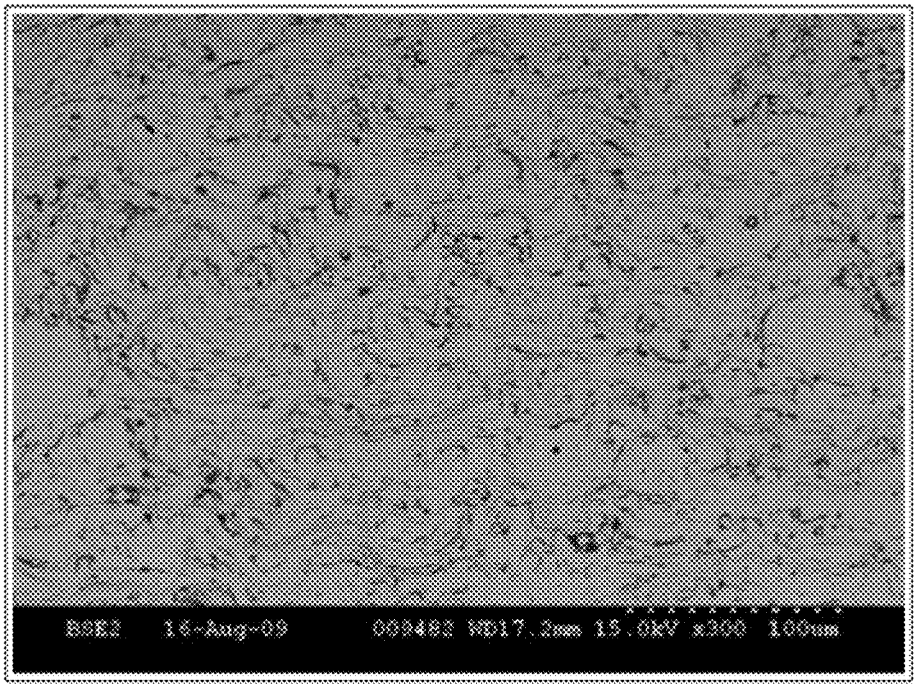
Figure 12:
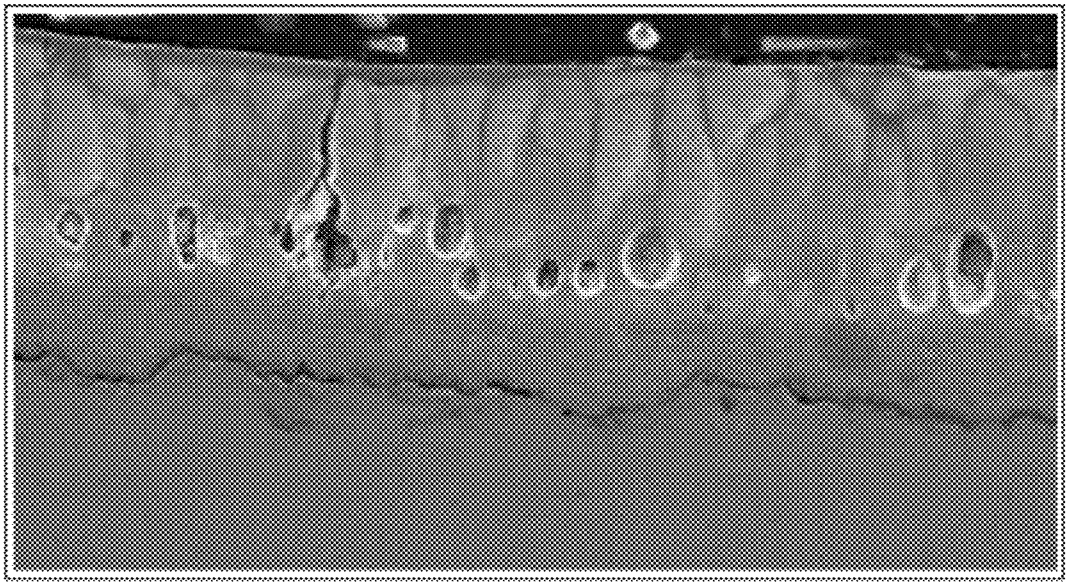
Figure 13:
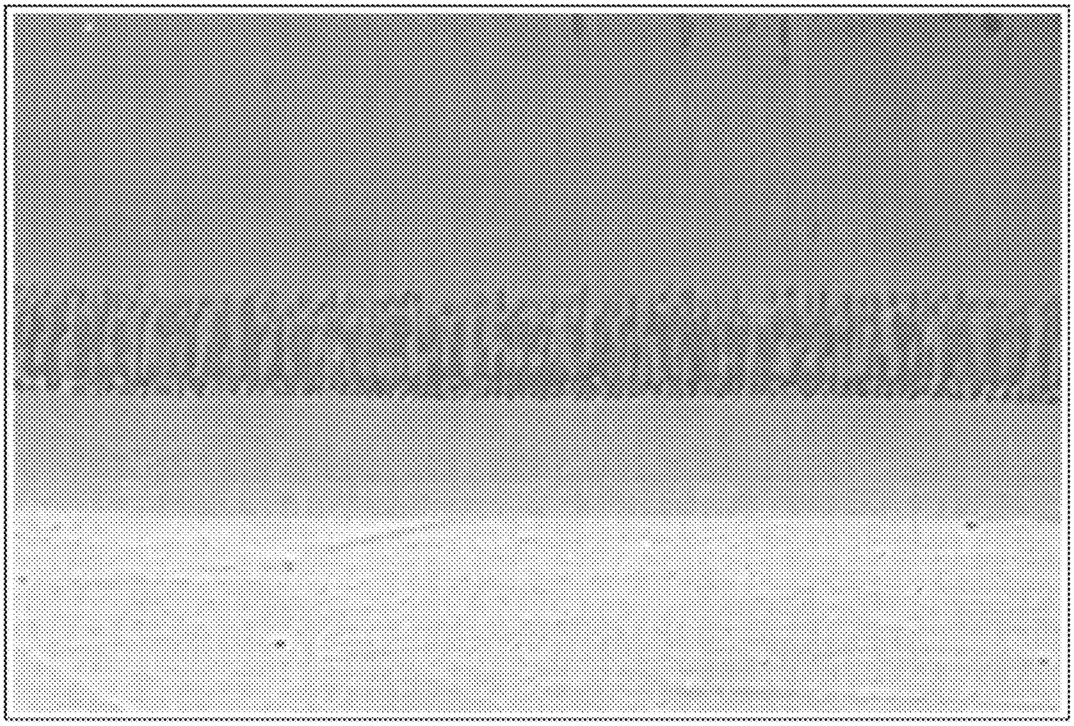
Figure 14:
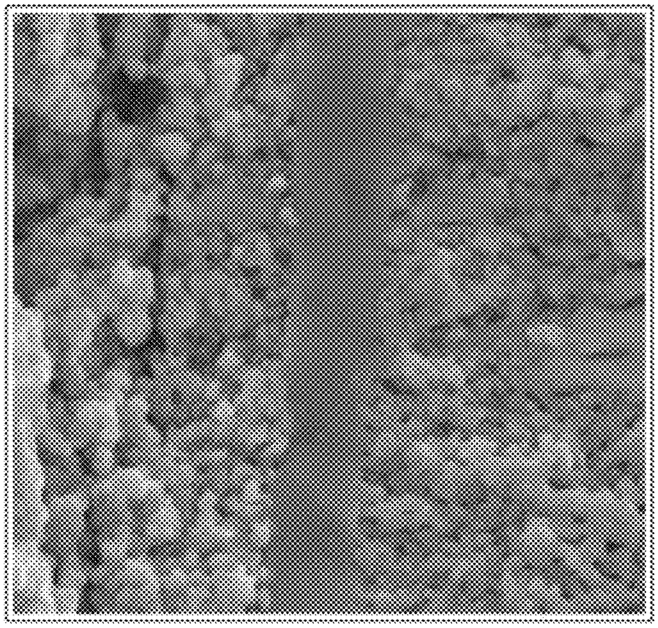
Figure 15:
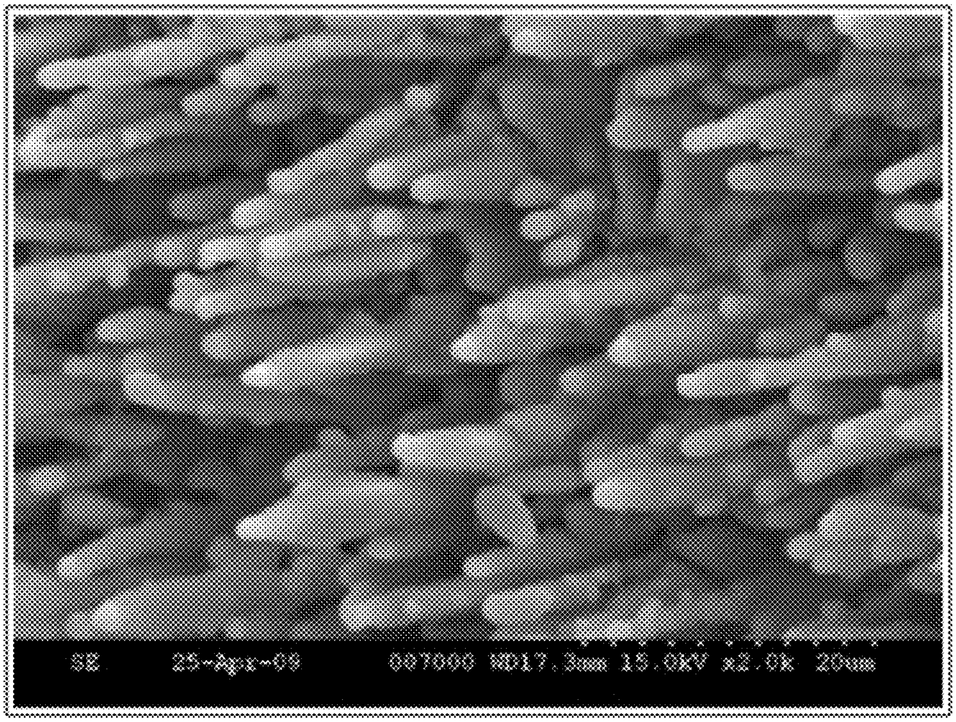
Figure 16:
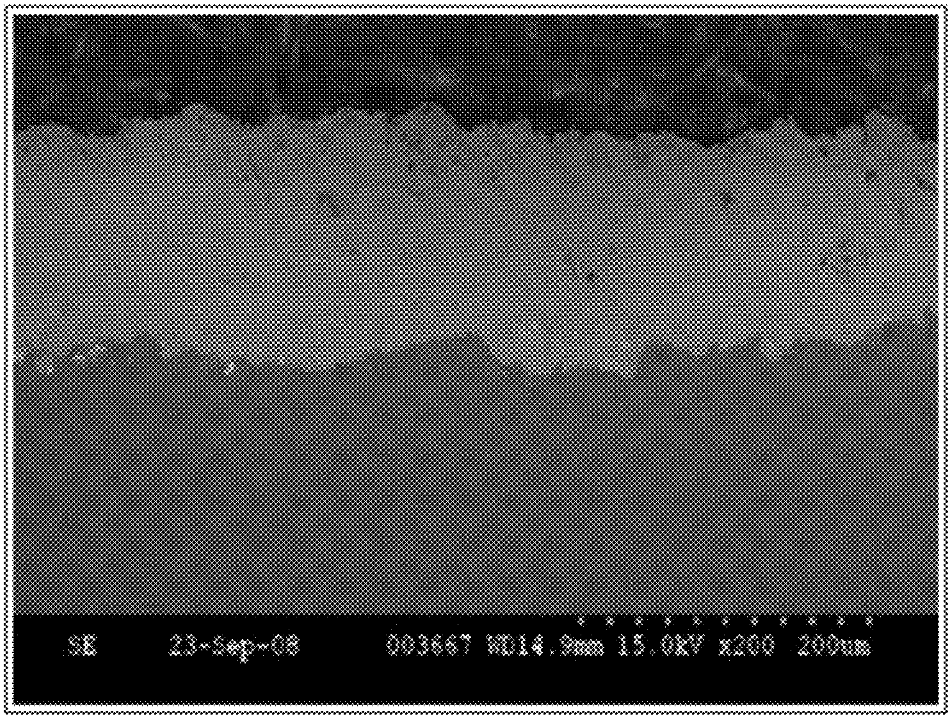
Figure 17:
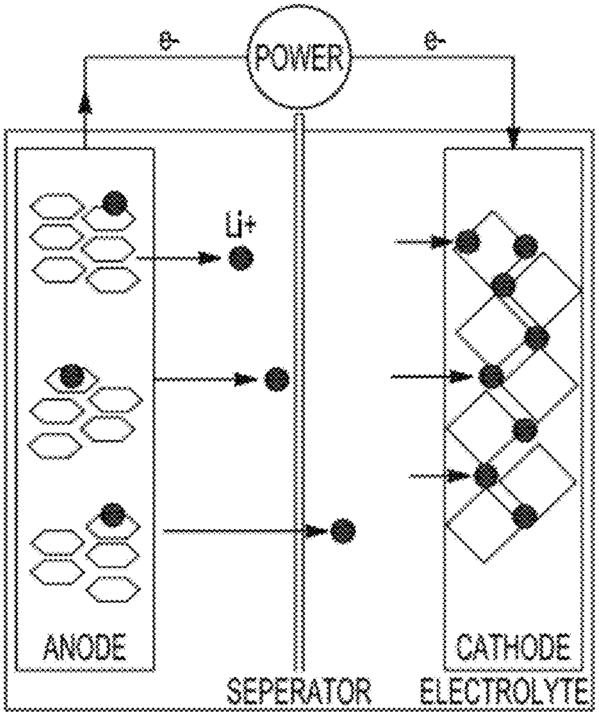
Figure 18:
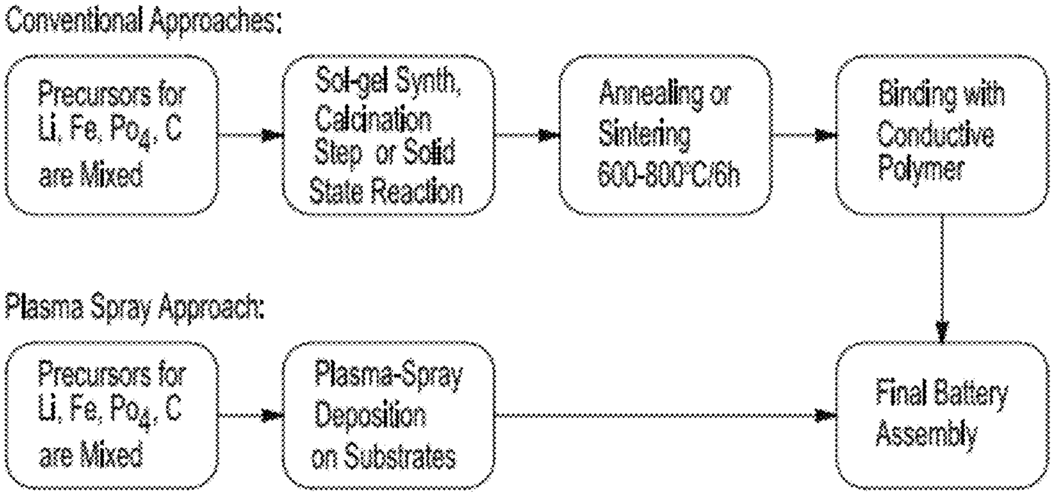
Figure 19:
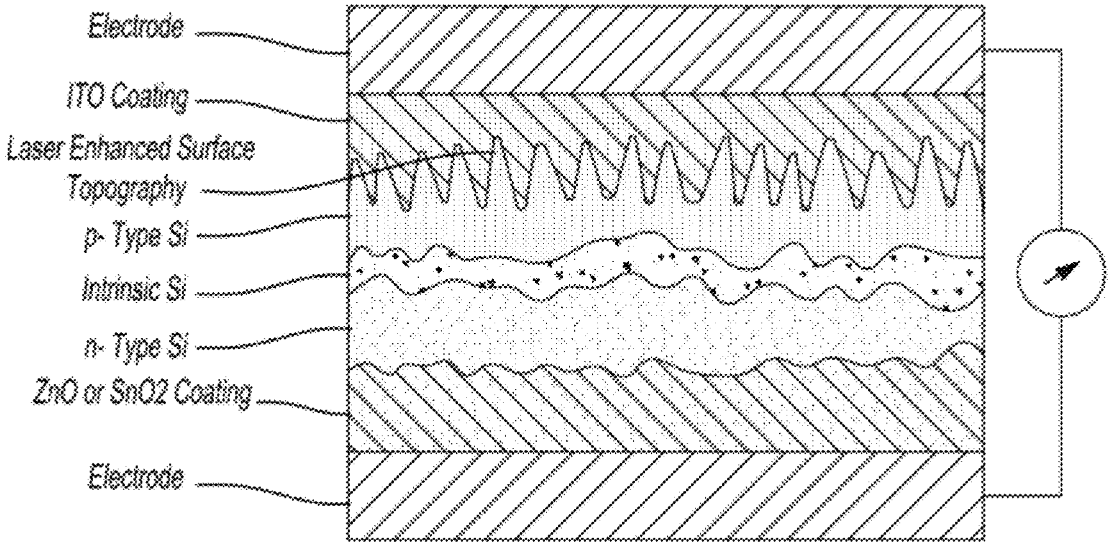
Figure 20A:
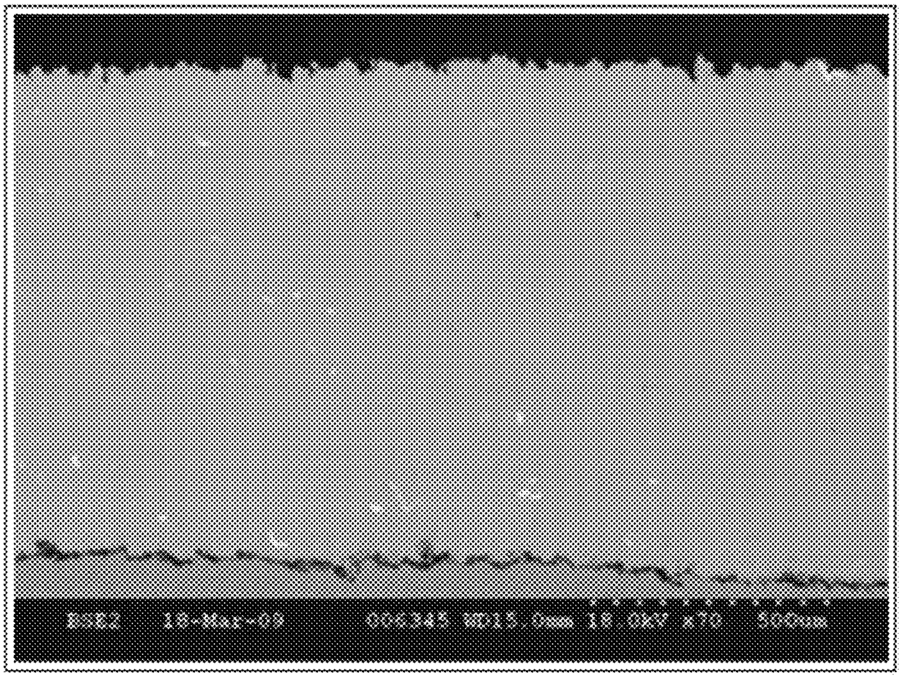
Figure 20B:
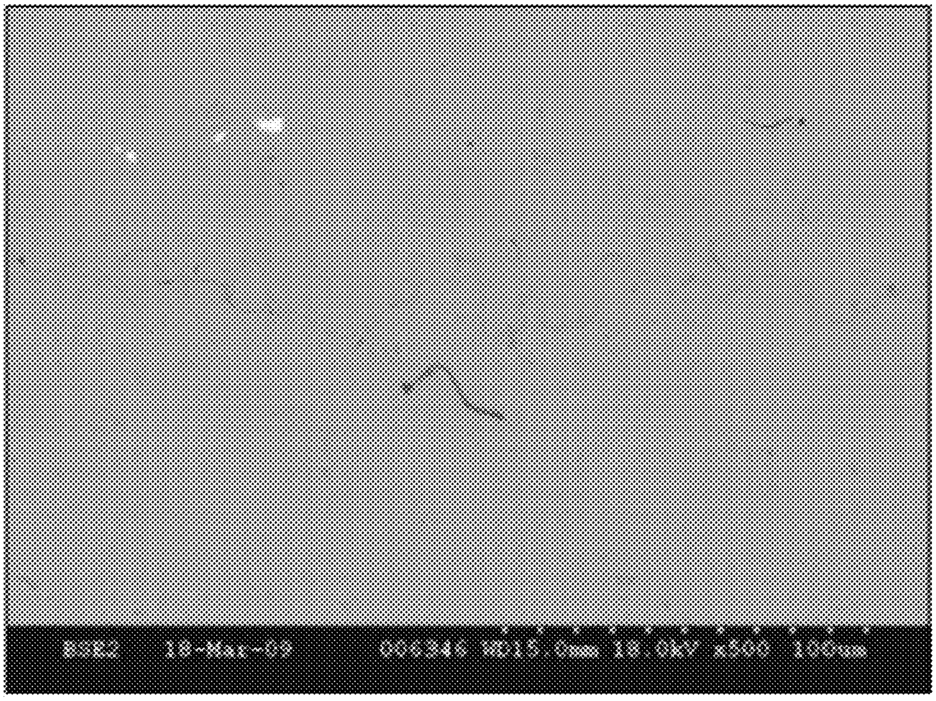
Figure 21:
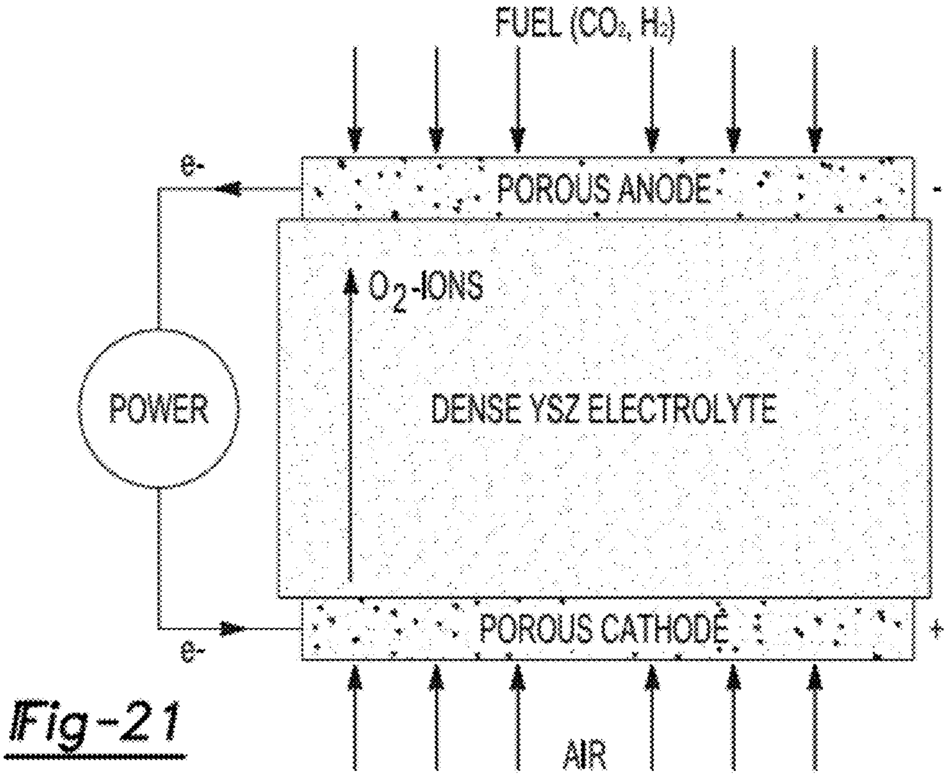
Figure 22:
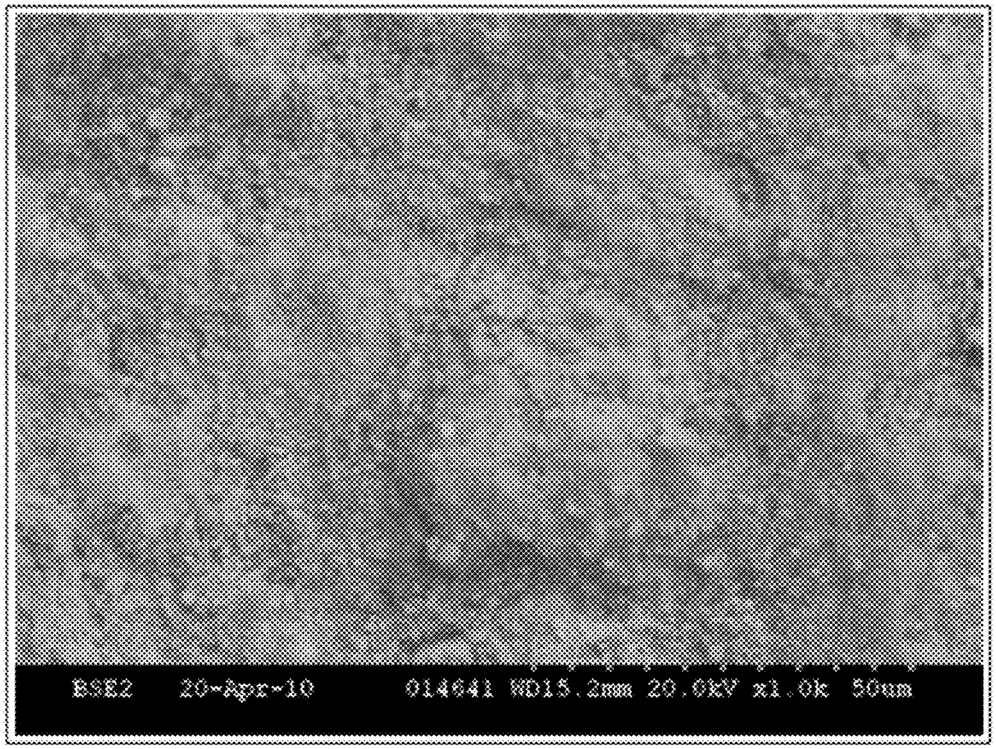

FIGS. 6(*a*)-(*c*) are schematic views of a laser and plasma hybrid system according to the principles of the present teachings;

FIG. 7 is a schematic view of a modified direct current plasma apparatus according to the principles of the present teachings having a plurality of opening disposed in the cathode;

FIG. 8 is a schematic view of a modified direct current plasma apparatus according to the principles of the present teachings having a central opening extending beyond a tip of the cathode;

FIGS. 9(*a*)-(*l*) are schematic views of modified direct current plasma apparatus and subcomponents according to the principles of the present teachings introducing precursor downstream of the anode;

FIG. 10(*a*) is a schematic view of a direct current plasma apparatus;

FIG. 10(*b*) is a photograph of the arc inside the direct current plasma apparatus with the cathode according to the principles of the current teachings;

FIG. 11 is an SEM image of a coating achievable using the direct current plasma apparatus of the present teachings;

FIG. 12 is an SEM image of a coating achievable using the direct current plasma apparatus of the present teachings;

FIG. 13 is an SEM image of a coating achievable using the direct current plasma apparatus of the present teachings;

FIG. 14 is an SEM image of a coating achievable using the direct current plasma apparatus of the present teachings;

FIG. 15 is an SEM image of a coating achievable using the direct current plasma apparatus of the present teachings;

FIG. 16 is an SEM image of a coating achievable using the direct current plasma apparatus of the present teachings;

FIG. 17 is a schematic view illustrating a Li-ion battery being made according to the principles of the present teachings;

FIG. 18 is a schematic flowchart illustrating a comparison of a conventional processing approach for making a Li-ion battery relative to a processing approach for making a Li-ion battery according to the present teachings;

FIG. 19 is a schematic cross-sectional view of a deposition pattern for a solar cell being made according to the present teachings;

FIGS. 20(*a*)-(*b*) are SEM images of a coating achievable using the direct current plasma apparatus of the present teachings;

FIG. 21 is a schematic cross-sectional view of a solid oxide fuel cell being made according to the present teachings; and FIG. 22 is an SEM image of a coating demonstrating the effect of insufficient melting of precursor particles.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms “a”, “an” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on”, “engaged to”, “connected to” or “coupled to” another element or layer, it may be directly on, engaged, connected or coupled to the other element or layer, or intervening elements or layers may be present. In contrast, when an element is referred to as being “directly on,” “directly engaged to”, “directly connected to” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Spatially relative terms, such as “inner,” “outer,” “beneath”, “below”, “lower”, “above”, “upper” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Figure 1A:
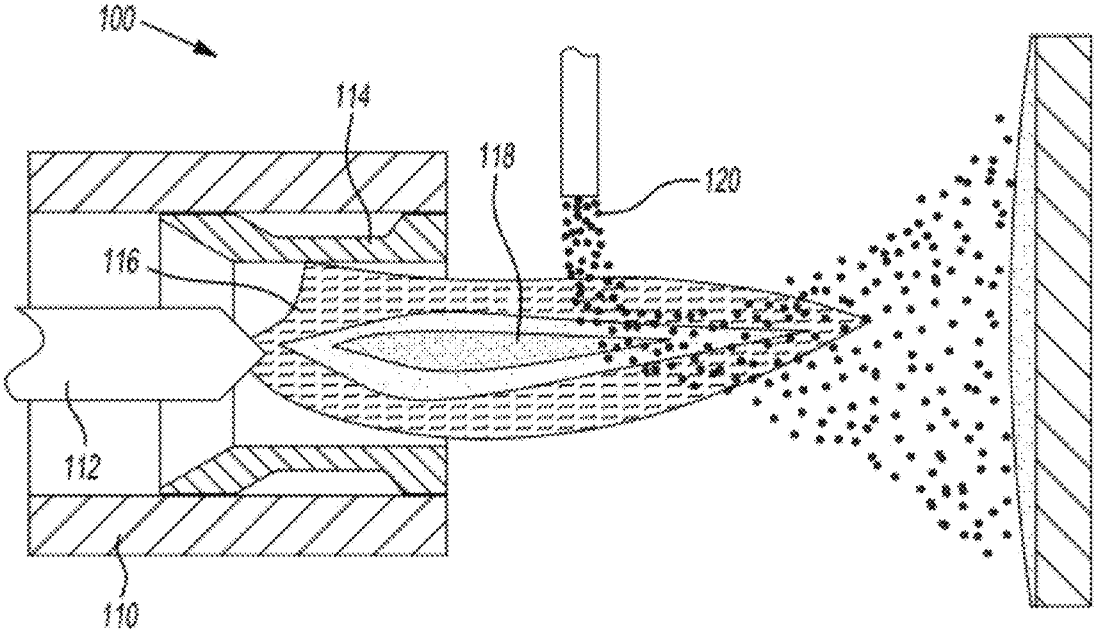
FIG. 1(*a*) is a schematic view illustrating a conventional direct current plasma system.
Figure 1B:
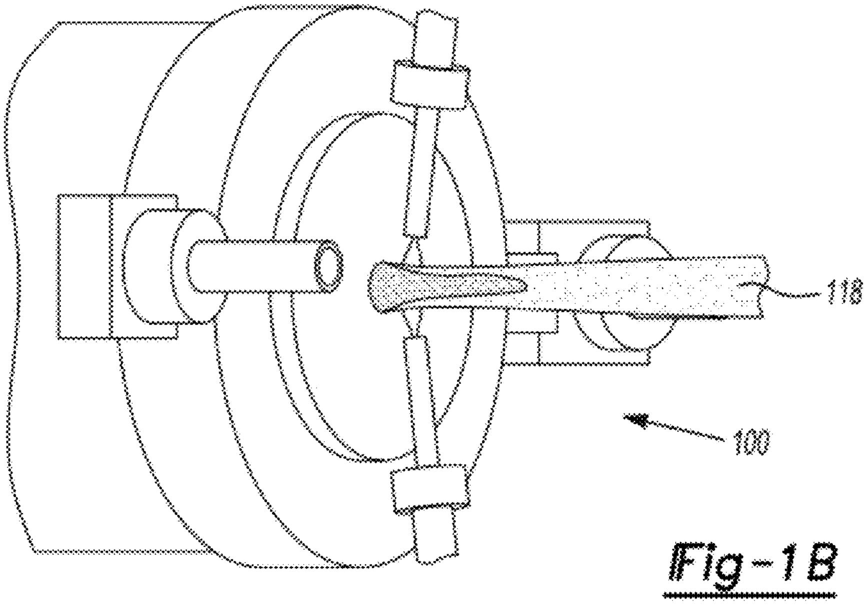
Figure 2:
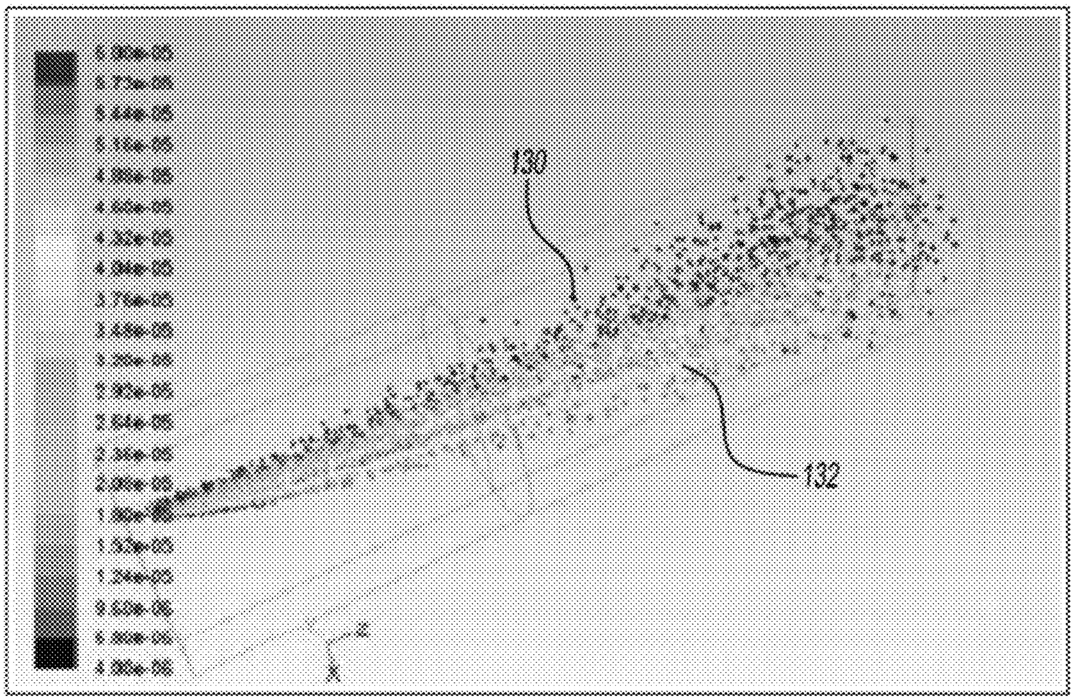
FIG. 2 is a particle trace simulation illustrating particle temperature for a conventional direct current plasma system with radial injection.
Figure 3:
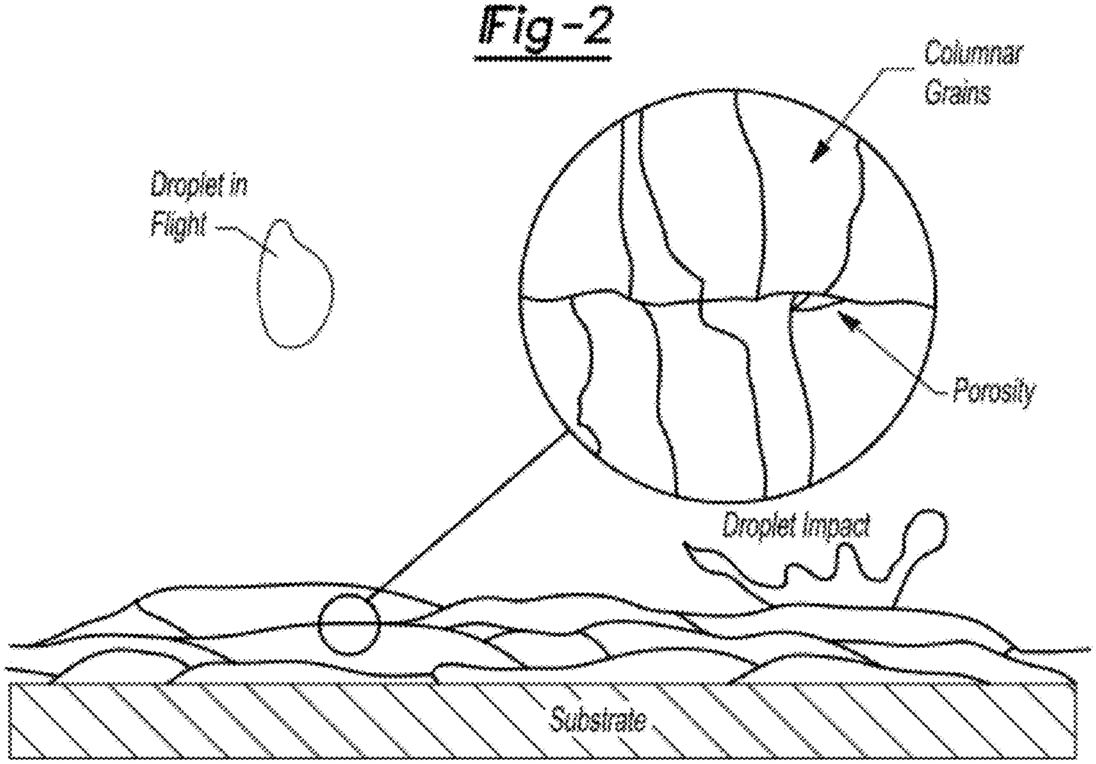
FIG. 3 is an enlarged schematic of conventional particle deposits on a target.
Figure 4:
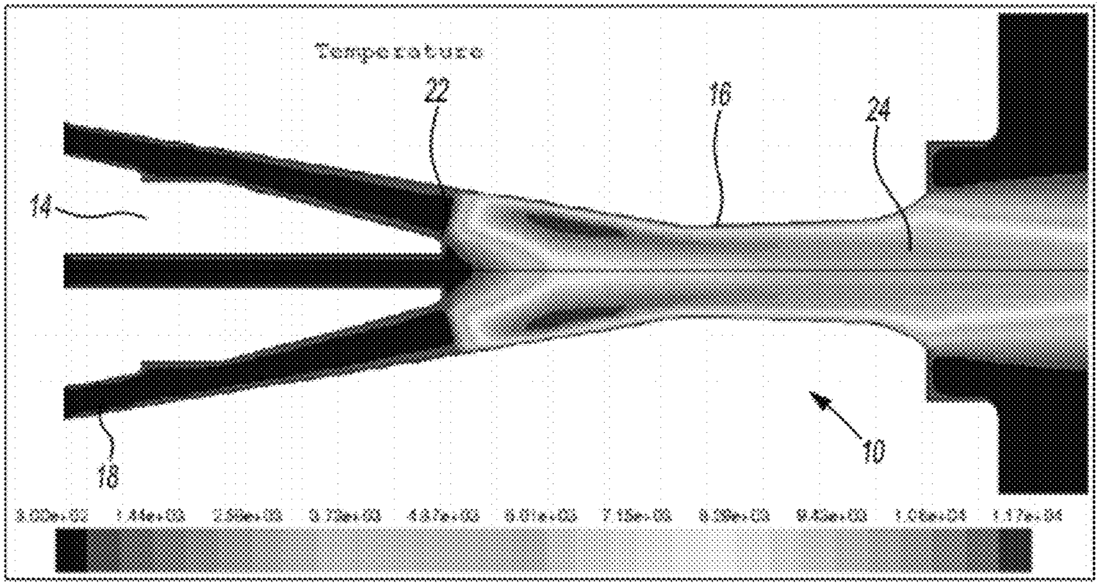
FIG. 4 is a schematic view of a cathode injection device according to the principles of the present teachings.

According to the principles of the present teachings, improved methods of applying a coating to a target using a modified direct current plasma apparatus and method are provided having a wide variety of advantages. In some embodiments, precursor can be injected through the cathode (see FIG. 4) and/or through an axial injector in front of the anode (see FIG. 5) rather than radially injected as described in the prior art. The principles of the present teachings have permitted formulation and the associated achievement of certain characteristics that have application in a wide variety of industries and products, such as battery manufacturing, solar cells, fuel cells, and many other areas.

Still further, according to the principles of the present teachings, in some embodiments as illustrated in FIG. 6, the modified direct current plasma system can comprise a laser system to provide an in-situ hybrid apparatus capable of producing a plurality of coating types, as illustrating in FIGS. 13-15. These coating have particular utility in a wide variety of applications, such as solar, biomedical, and fuel cells.

With reference to FIGS. 4-9, a modified direct current plasma apparatus 10 is illustrated according to the principle of the present teachings. In some embodiments, modified direct current plasma apparatus 10 generally comprises a housing 12 having a cathode 14 (which is negatively charged) extending there through and an anode 16 (which is positively charged) proximally disposed relative to cathode 14 for electrical communication therewith. An annular channel 18 extends about cathode 14 and generally between cathode 14 and anode 16. Annular channel 18 fluidly communicates a plasma gas 20 as a gaseous inflow from a source (not shown) to a position at least adjacent a tip 22 of cathode 14. An electrical arc is established and extends between cathode 14 and anode 16 in a conventional manner. The electrical arc ionizes plasma gas 20 to define a plasma jet 24 downstream of cathode 14. A precursor material 26, having a composition of desired particles and/or other material, is introduced into at least one of plasma gas 20 and/or plasma jet 24, as will be discussed in detail herein. In some embodiments, precursor material 26 can be introduced into plasma gas 20 and/or plasma jet 24 from a position generally axially aligned with cathode 14. The powders (solid) or droplets (liquid) or gases within precursor 26 are then entrained into the hot plasmas jet 24 and travel with it, eventually forming the desired material, melting and being deposited on a desired target. In some embodiments, precursor 26 can comprise a plurality of nanoparticles. In some embodiments, precursor 26 can be a powder of micrometer sized particles of different compounds, a solution of multiple chemicals, a suspension of micrometer or nanometer sized particles of different compounds in a matrix, or a suspension of micrometer or nanometer sized particles within a matrix of solution of multiple chemicals or a gaseous mixture. When treated in the plasma jet, the precursor results into the desired material.

Axial Injection Through Cathode

According to some embodiments of the present teachings, it has been found that axial injection of precursor 26 into plasma gas 20 upstream of a tip 28 of cathode 14 can significantly improve the coating achieved following a modified DC plasma process.

Figure 10A:
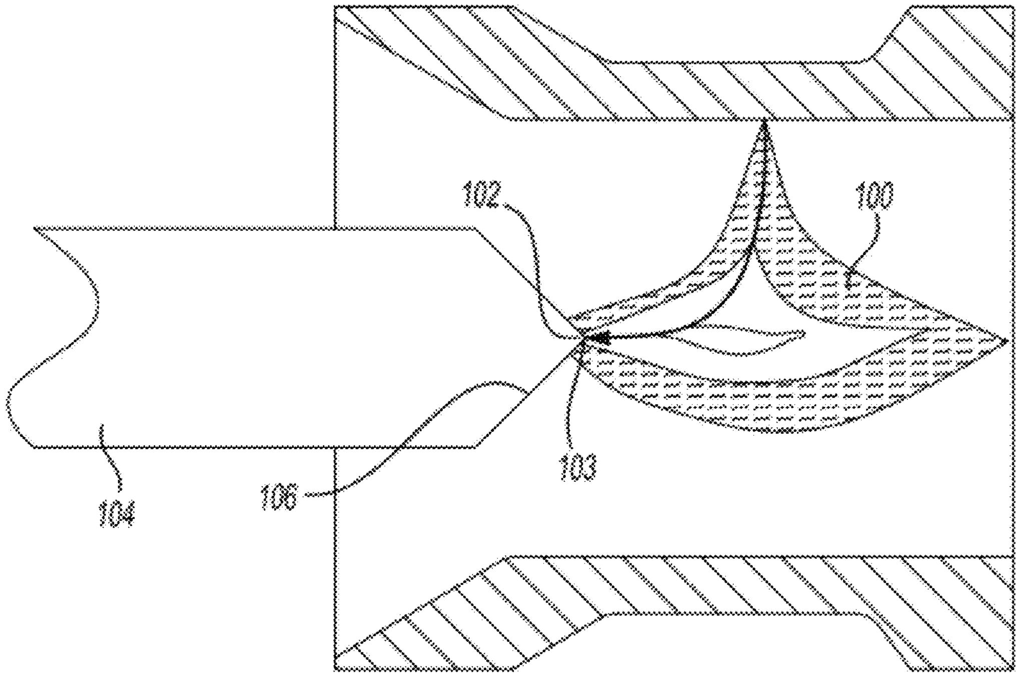
Figure 10B:
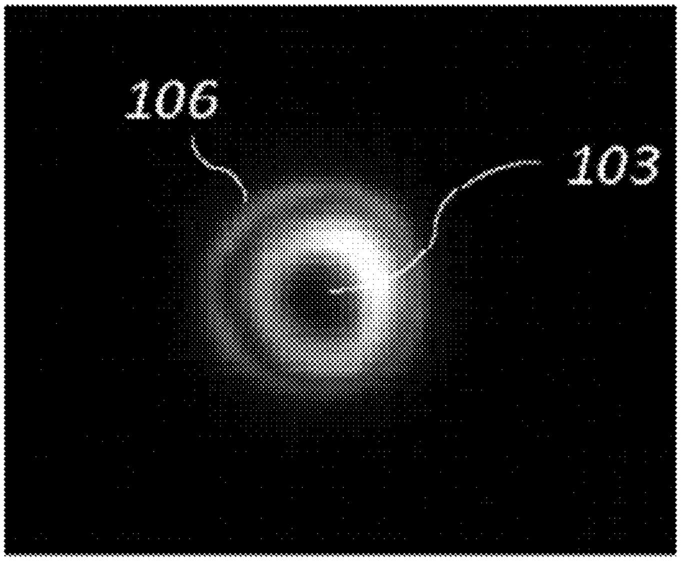

Briefly, by way of background, several systems have previously attempted to achieve this axial injection using a plurality of precursor outlets disposed in the cathode. However, no commercial system exists that employs this approach primarily because directly feeding a precursor through the cathode typically limits the life of the cathode. That is, as seen in FIG. 10*a*, a typical plasma arc 100 is illustrated originating from a tip 102 of a solid cathode 104. When a precursor outlet 103 is made in cathode 104, the arc root, generally indicated at 106, moves to the periphery of the precursor outlet 103 (as seen in FIG. 10*b*), which increases the localized temperature about the precursor outlet 103. This increased localized temperature cause precursor flowing from the precursor outlet 103 to immediately interact with hot outlet 103, causing the particles or droplets within the precursor to melt and immediately collect at the rim of the precursor outlet 103. Accelerated deposition of the particles or droplets at the precursor outlet 103 leads to premature clogging of the precursor outlet 103 and reduced operational life of the cathode 104.

To overcome this problem, in some embodiments as illustrated in FIG. 7, the present teachings provide a cathode 14 having a plurality of precursor outlet lines 30 radially extending outwardly from a central line 32 extending axially along cathode 14. Each of the plurality of precursor outlet lines 30 terminated at an exposed opening 34 along a tapered sidewall portion 36 of cathode 14. The exposed openings 34 are disposed at a location upstream a distance “a” from the arc root 38. In this way, the arc root 38, being sufficiently downstream of openings 34, is not disturbed nor drawn to openings 34, thereby maintaining a suitable localized temperature at openings 34 to prevent premature heating, melting, and deposition of particles or droplets contained in the precursor at or near openings 34. Generally, it has been found that positioning openings 34 upstream of the arc root 38 permits one to obtain the benefits of the present teachings. This arrangement has been found to be particularly well-suited for use with gaseous precursors; however, utility can be found herein in connection with a wide variety of precursor types and materials.

Cathode 14, having the radially extending precursor outlet lines 30 ensures atomization of the liquid precursor stream. The perforated design further ensured stable gun voltage as well as improved cathode life. Further, because of the efficiency of delivering precursor 26 upstream of arc root 38, smaller, nano-sized particles contained in precursor 26 are more likely to be properly entrained in the flow of plasma gas 20 and, thus, are less likely to become deposited on cathode 14 or anode 16. Accordingly, smaller particles can be reliably and effectively synthesized/treated and deposited on a target without negatively affecting the useful life of cathode 14.

However, in some embodiments as illustrated in FIG. 8, the present teachings provide a cathode 14' having a centrally disposed precursor line 32' extending axially along cathode 14' and terminating at an exposed opening 34'. Precursor line 32' receives and carries the precursor 26 to exposed opening 34'. To this end, it is desirable that precursor line 32' is electrically insulated from cathode 14'. Exposed opening 34' extends sufficiently downstream a distance "b" of a tip 22' of cathode 14' to generally inhibit deposition of particles or droplets contained in the precursor at or near exposed opening 34'. As a result of the extended position of exposed opening 34' relative to cathode tip 22', the subsequent heating and melting of the particles or droplets in the precursor occurs at a position downstream of both cathode tip 22' and exposed opening 34', thereby prevent deposition of the melted particles on cathode 14'. This arrangement has been found to be particularly useful for the successful melting and deposition of high melting point materials, such as TaC, (melting point ~4300° C.) using 20 kW power. Such achievement has not previously been possible prior to the introduction of the present teachings. An SEM image of deposit TaC coating is illustrated in FIG. 16. Further, in some embodiment of the present teachings, a liquid atomizer is utilized at opening 34' to achieve a desired size of droplets that is introduced to the plasma. This attribute enables better control on the particle size that is synthesized from a liquid precursor.

Furthermore, according to the principles of the present teachings, precursor one 120 and precursor two 26 can independently be fed enabling functionally gradient coating deposition. The particle size, phase and density control as well as the efficiency can thus be substantially improved by this axial feeding of the liquid precursor. Using this approach, various nanomaterials, such as HAP/TiO2 composite, Nb/TaC composite, YSZ and V2O5, have been successfully synthesized for high temperature, energy and biomedical applications.

Axial Injection Through Front Injector

In some embodiments of the present teachings, direct current plasma apparatus 10 can comprise injection of a liquid-based precursor 26 downstream of anode 16. Specifically, using this approach, liquid precursor can be efficiently atomized into droplets inside direct current plasma apparatus 10. This capability has enabled the synthesis of many nanostructured materials resulting in improvements in terms of process control and coating quality.

Figure 5:
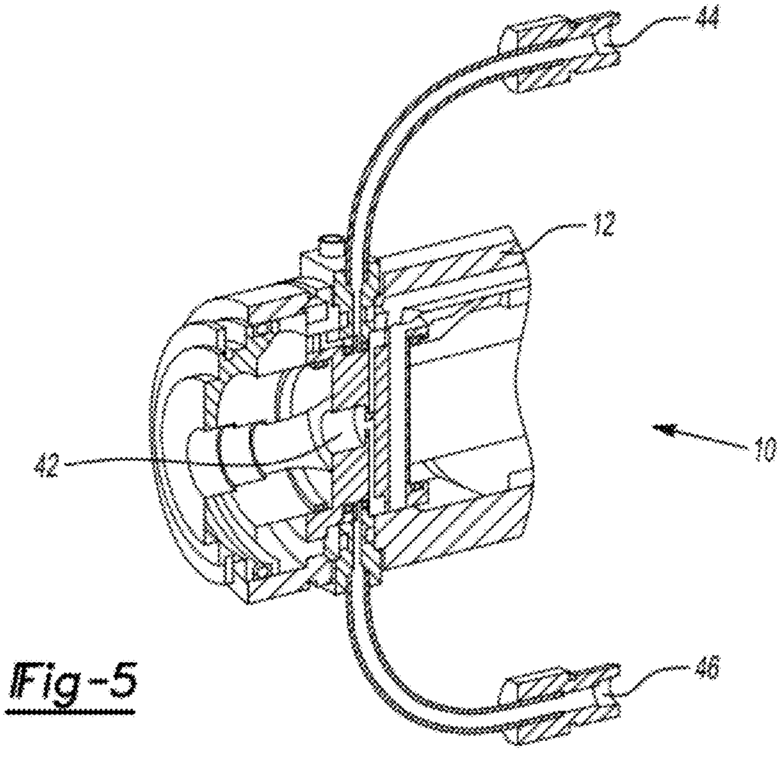
FIG. 5 is a schematic view of an anode injection device according to the principles of the present teachings.
Figure 9A:
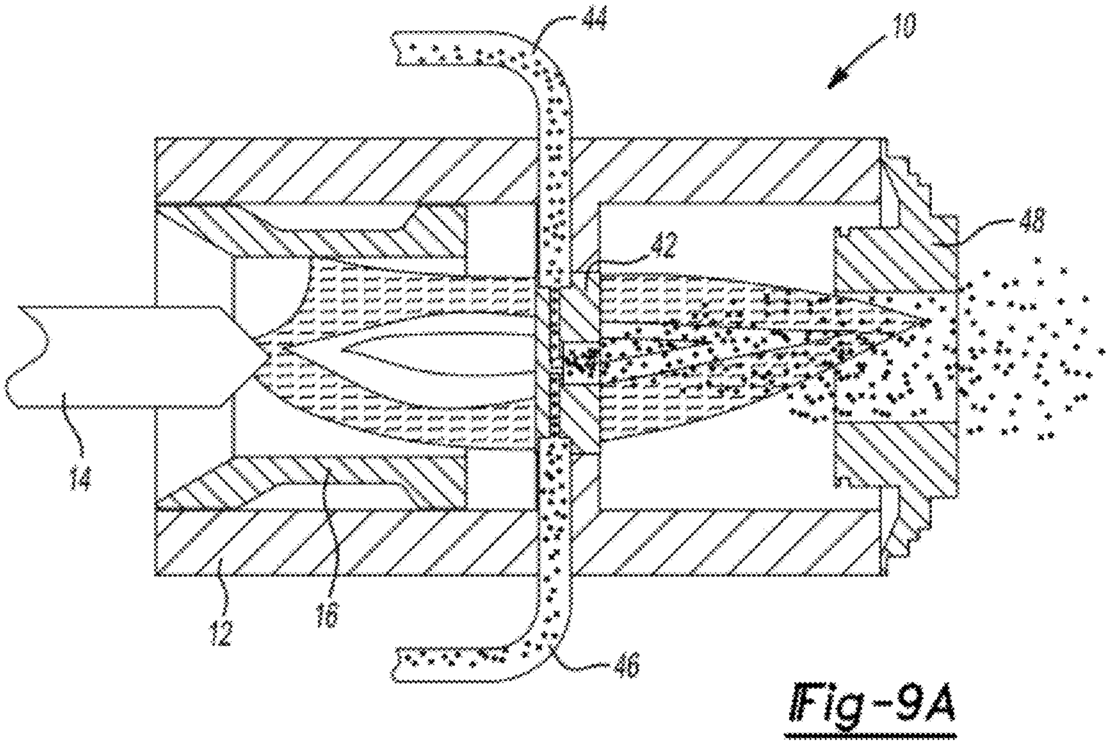
Figure 9B:
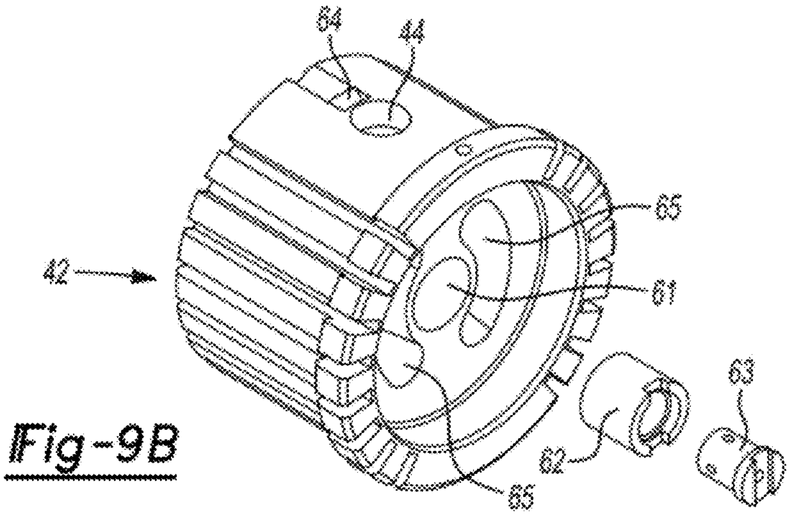
Figure 9C:
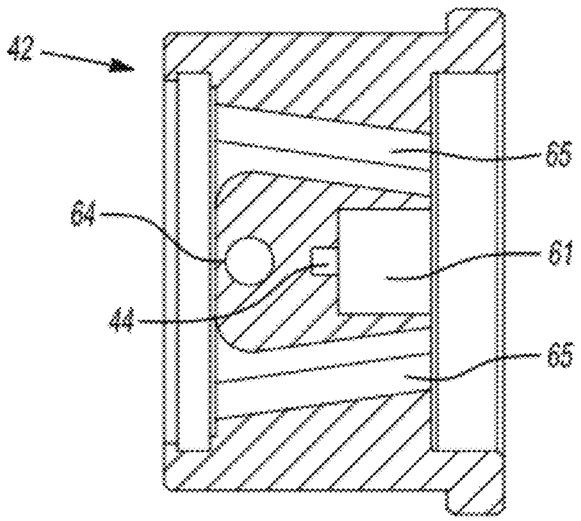
Figure 9D:
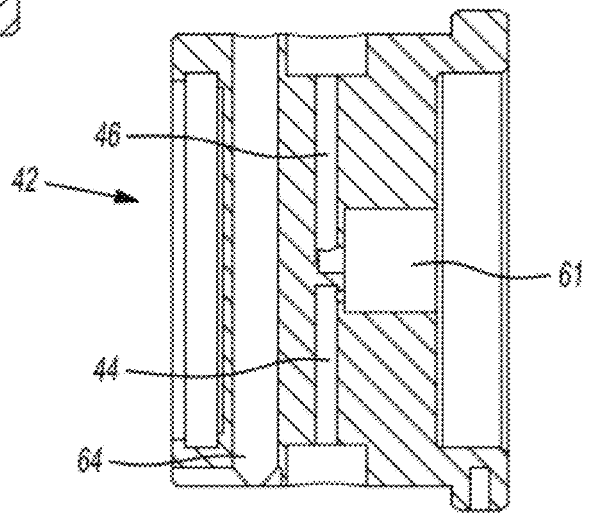
Figure 9E:
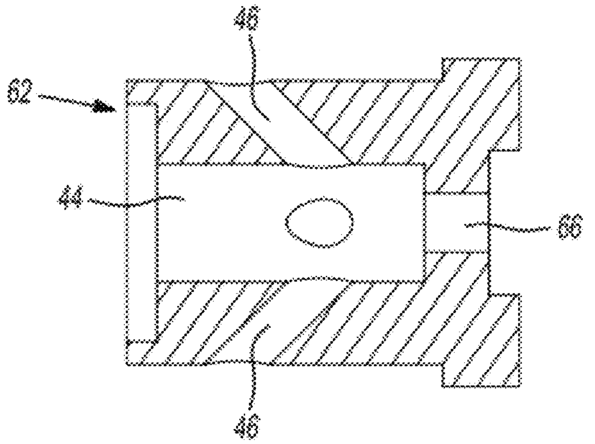
Figure 9F:
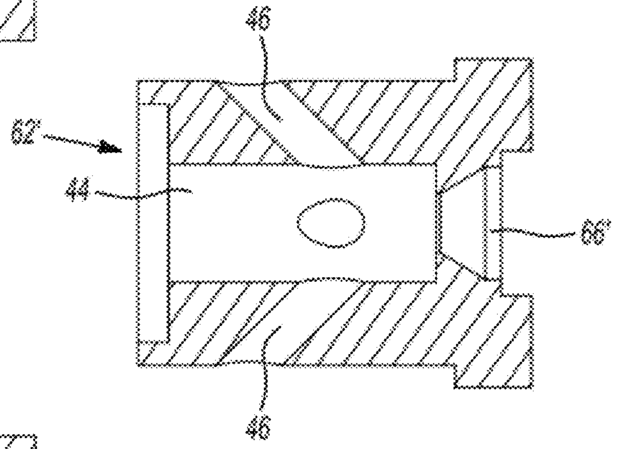
Figure 9G:
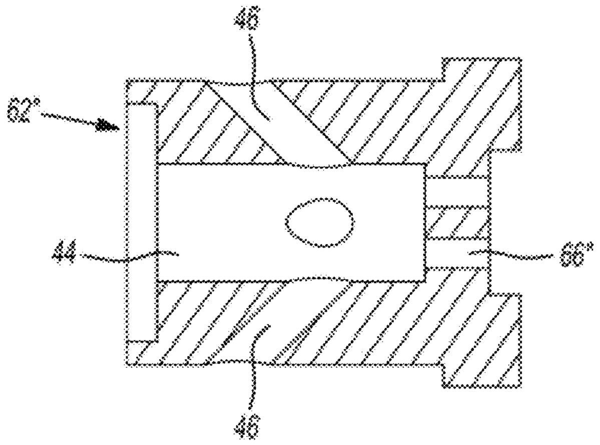
Figure 9H:
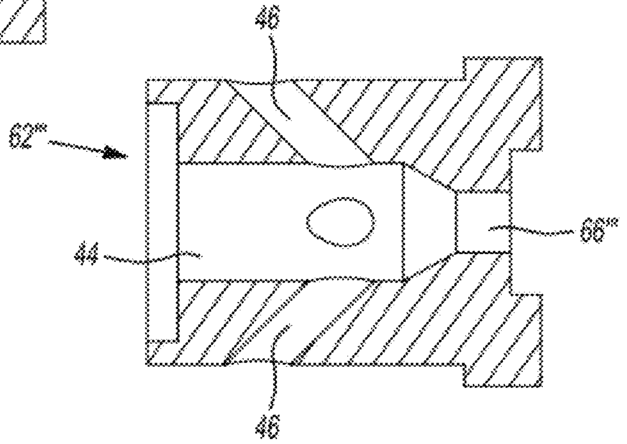

In this way, as illustrated in FIGS. 5 and 9*a*, direct current plasma apparatus 10 can comprise an axial atomizer assembly 42 having a liquid precursor input 44 and a gas input 46 collectively joined to introduce liquid droplets of precursor 26 at a position downstream of anode 16 and upstream of a water-cooled nozzle 48. FIG. 9*b* illustrates the subcomponents of the atomizer assembly 42. In some embodiments, it can comprise precursor input 44, gas input 46 (See FIG. 9*d*), an atomizer housing 61, an atomizing body 62, an atomizer cap 63, water cooling input 64 and two plasma paths 65. FIGS. 9*c* and 9*d* illustrate cross sectional views of the atomizer assembly. FIG. 9*e* shows the cross section of the atomizing body 62 consisting of precursor input 44 and gas inputs 46 and a droplet outlet 66. Different embodiments of the atomizing body 62, 62', 62", and 62'" are shown in FIGS. 9*e* through 9*h*. Atomized precursor droplets undergo secondary atomization by the plasma jet 24 emerging through plasma paths 65 resulting in fine droplets for material synthesis and deposition on a substrate or target. In some embodiments of the apparatus 10, the precursor can be simply gaseous in nature.

Figure 9I:
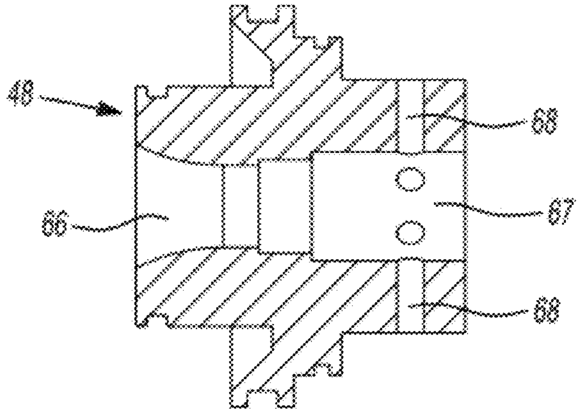
Figure 9J:
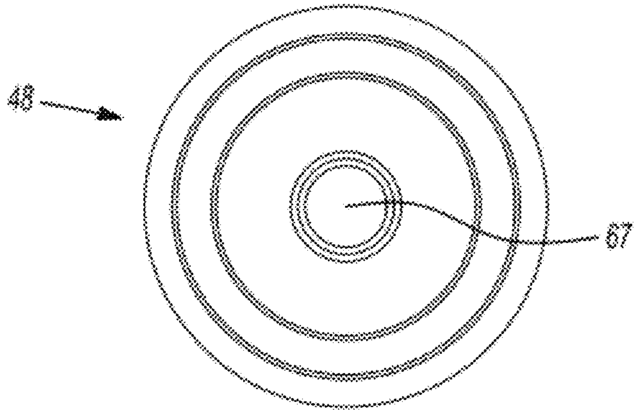
Figure 9K:
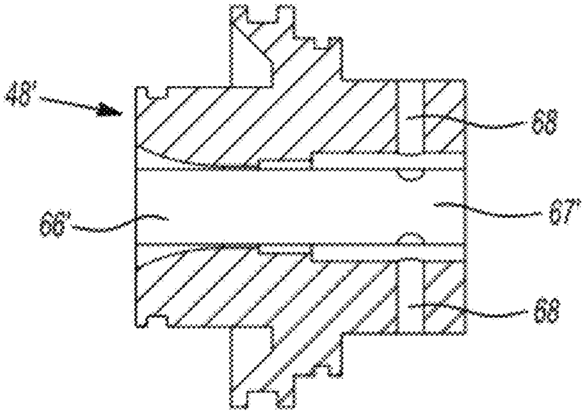
Figure 9L:
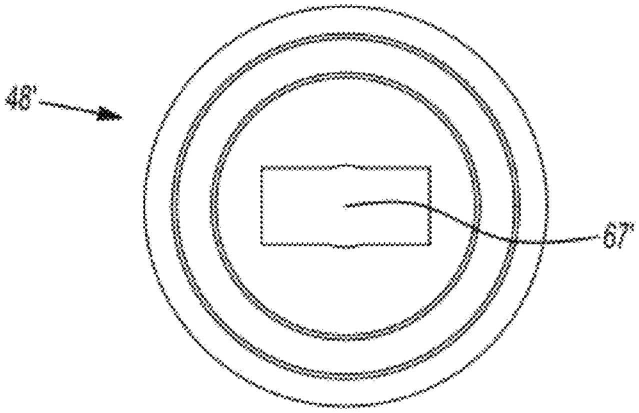

In some embodiment of the present teachings, the exit nozzle 48 comprises of plasma inlet 66, plasma outlet 67 and gaseous precursor inputs 68. The gaseous precursor input 68 can introduce gases such as acetylene to coat or dope the molten particles with a desired material prior to deposition. This particular approach is beneficial to battery manufacturing where carbon doping is required for enhancing the conductivity. The plasma outlet 67 can assume different cross sectional profiles such as cylindrical, elliptical and rectangular. FIGS. 9*i* and 9*j* illustrate the side and front views of a cylindrical nozzle. FIGS. 9*k* and 9*l* illustrate the views of rectangular profile. Such renditions are beneficial to control the particle size distribution in the atomized droplets to enhance their synthesis characteristics.

This design ensured the entrainment of all the liquid droplets in the plasma jet 24 leading to higher deposition efficiency and uniform particulate characteristics. Further, this design also enables embedment of nanoparticles into a bulk matrix resulting in a composite coating. The matrix material and the liquid precursor are independently fed enabling functionally gradient coating deposition. Using this approach, various nanomaterials, such as TiO2, YSZ, V2O5, LiFePO4, LiCoO2, LiCoNiMnO6, Eu-doped SrAl2O4, Dy-doped SrAl2O4, CdSe, CdS, ZnO, InO2 and InSnO2 have been successfully synthesized for high temperature, energy and biomedical applications.

In-Situ Plasma/Laser Hybrid Process

Typical plasma coatings made using powder or liquid precursors have a particulate structure as illustrated in FIG. 11. The inter-particulate boundaries contain impurities and voids which are detrimental to properties of these coatings. Researchers have attempted to use a laser beam to remelt and densify coatings following complete deposition and formation of the article. However, a laser beam has a limited penetration depth and, thus, thick coatings cannot be adequately treated. Moreover, post deposition treatment typically leads to defects and cracks, especially in ceramic materials as shown in FIG. 12.

Figure 6A:
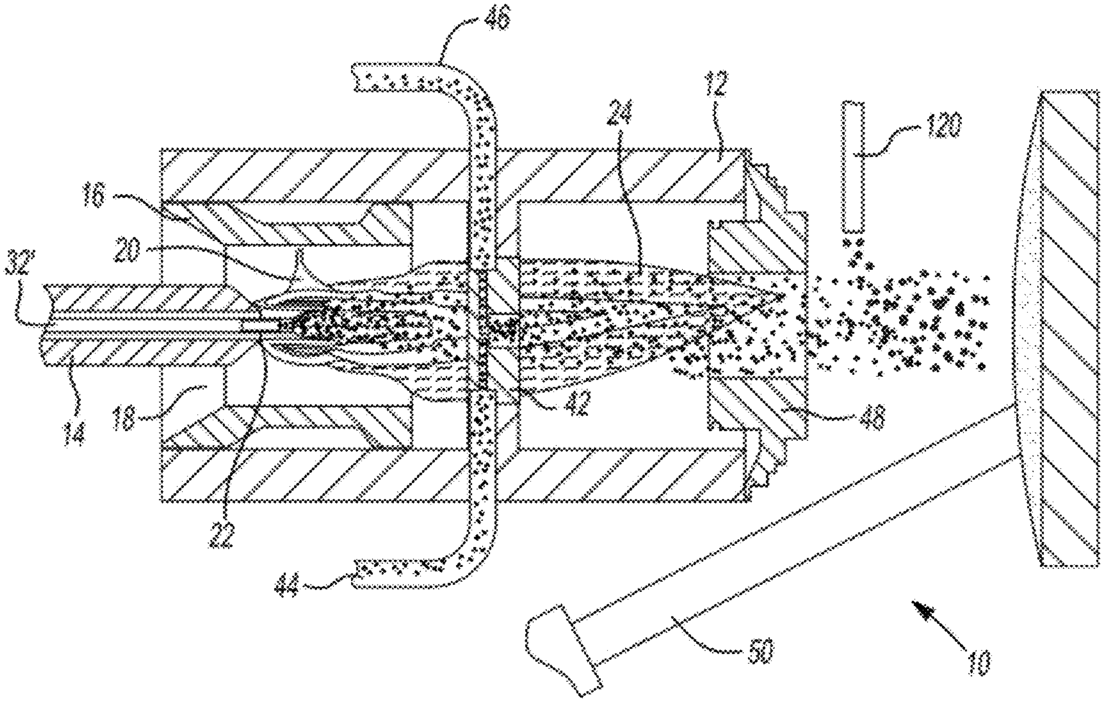
Figure 6B:
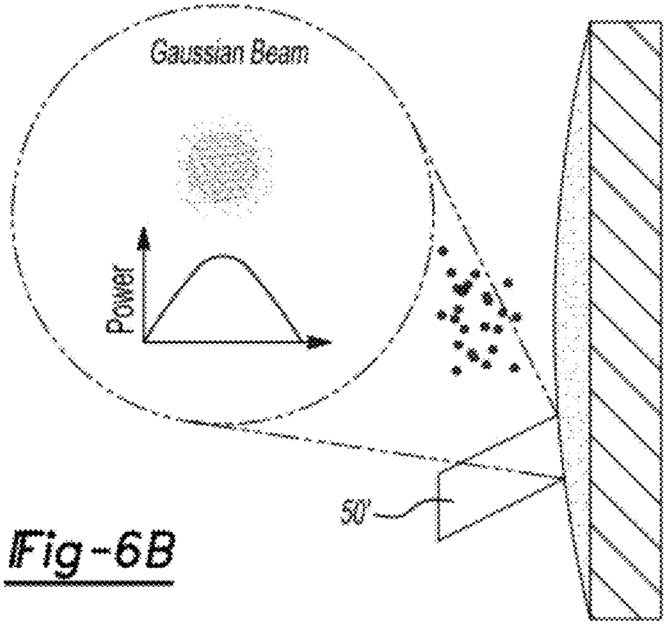
Figure 6C:
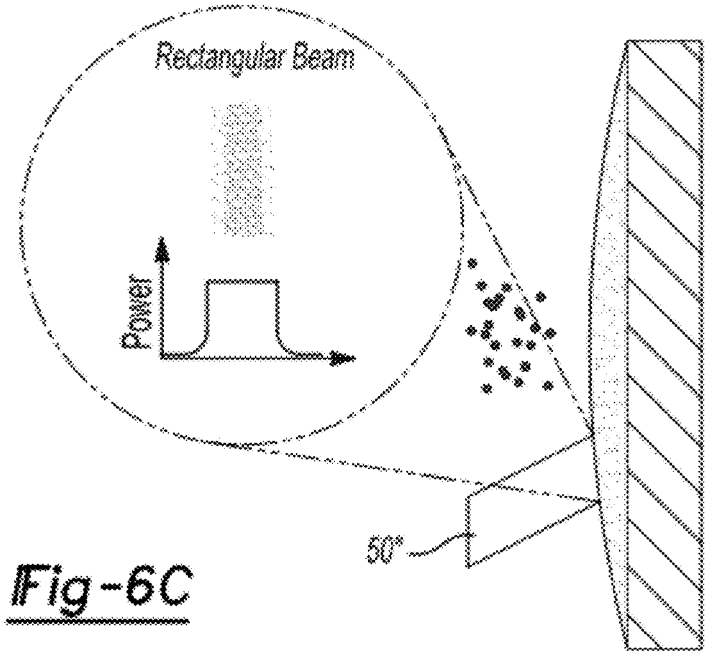

However, according to the principles of the present teachings, direct current plasma apparatus 10, as illustrated in FIG. 6*a*, is provided with a laser beam that is capable of treating the coating, layer by layer, nearly simultaneously as the layers are deposited by plasma jet 24 on the substrate. That is, laser radiation energy output from a laser source 50 can be directed to coating deposited on a substrate using the methods set forth herein. In this regard, each thinly-deposited layer on a substrate can be immediately modified, tailored, or otherwise processed by the laser source 50 in a simple and simultaneous manner. Specifically, laser source 50 is disposed adjacent or integrally formed with modified direct current plasma source 10 to output laser radiation energy upon the substrate being processed. In some embodiment of the present teachings the laser beam can assume either a Gaussian energy distribution 50' or rectangular 50" (multimode) energy distribution illustrated in FIGS. 6*b* and 6*c*. Further, the laser beam can be delivered via an optical fiber or an optical train or their combinations. In some embodiment of the present teachings, multiple laser beams with same or dissimilar characteristics (wave length, beam diameter or energy density) can be utilized to perform pretreatment or post treatment of the aforementioned coatings.

This has considerable advantages, including, specifically, that less laser energy is needed as the treatment is done while the plasma coating is hot and thin. Most importantly, brittle materials like ceramics can be fused into thick monolithic coatings (see FIG. 13) such as produced by PVD and CVD process (commonly used for electrical and optical applications). Moreover, the growth rate in this process is μm/sec where as the growth rate of PVD and CVD coatings is nm/min. In fact, specifically designed coatings, such as illustrated in FIGS. 14 and 15, can easily be achieved.

According to the principles of the present teachings, the direct current plasma apparatus 10, specifically having laser source 50, can be effectively used for the creation of solid oxide fuel cells. In this way, the anode, electrolyte and the cathode layers are deposited by the direct current plasma apparatus 10 using either solid precursor powders, liquid precursors, gaseous precursors, or a combination thereof. In-situ densification of the layers is achieved with the laser source 50 by remelting the plasma deposited material, especially in the electrolyte layer. By carefully varying the laser beam wavelength and power, one can grade the density (i.e. define a gradient) across the electrolyte and its interfaces to enhance thermal shock resistance. In some embodiments, direct current plasma apparatus 10 can further comprise the teachings set forth herein relating to cathode and anode variations.

The principles of the present disclosure are particularly useful in a wide variety of application and industries, which, by way of non-limiting example, are set forth below.

Lithium Ion Battery Manufacturing:

As illustrated in FIG. 17, Li-ion battery cells typically comprise an anode and a cathode for battery operation. Different materials are being tested for both cathode and anode in the industry. In general, these materials are complex compounds, need to have good conductivity (carbon coated particulates), and should be made of nanoparticulates for maximized performance. Accordingly, the industrial battery manufacturing techniques of the present teachings comprise a multi-step material synthesis and electrode assembly process. In our approach we employ the plasma and laser technology developed above to directly synthesize the electrodes reducing the number of steps, time, and cost.

Cathode Manufacturing:

There are many material chemistries being explored such as LiFePO4, LiCoO2 and Li[NixCo1-2xMnx]O2. According to the principles of the present teachings, liquid precursors (solutions, and suspensions in solutions) are introduced using direct current plasma system 10 to synthesize the desired material chemistry and structure and directly form the cathodic film in a unique manner. The process is generally set forth in FIG. 18, wherein processing steps in the prior art are eliminated. Furthermore, it should be appreciated that laser source 50 can be employed to densify or further treat the layers or film, if desired.

Direct achievement of the cathodic film from solution precursors using plasma beam as described here has never been achieved in the prior art. The direct synthesis approach gives the ability to adjust the chemistry of the compound in situ. These teachings are not limited to the above mentioned compounds and can be employed to many other material systems.

In some embodiment of the present teachings one can also manufacture nanoengineered electrode compounds in powder form to be used in the current industrial processes. Further, in some embodiment of the current teachings one can also achieve thermal treatment of these powders in flight using the direct current plasma apparatus 10.

Anode Manufacturing:

As is generally known, silicon, in nano-particulate form or ultrafine pillar form (as shown in FIG. 15), is a good anode material. This material can be formed in the shape of pillars through various processes. Specifically, such pillars can be formed by treating a silicon wafer using a laser. However, using a silicon wafer to manufacture an anode is not a cost effective approach.

However, the ability to deposit silicon coating by direct current plasma apparatus 10 on a metal conductor and subsequent treatment using laser source 50 to make nanostructured surfaces permits large area anodes to be produced in a simple and cost effective manner. In some embodiment of these current teachings one can use the modified direct current plasma apparatus 10 to deposit silicon coatings and a catalyst layer to achieve nanostructured surfaces by subsequent thermal treatment. In fact following this approach, many other compounds, such as transition metal compounds, can be formed which have wide ranging applications, such as sensors, reactors, and the like.

In some embodiment of these teachings a gaseous precursor containing silicon can be used to deposit nanoparticles onto a desired target to manufacture nanoparticulate based electrodes. Further, these nanoparticulates can be coated with carbon using appropriate gaseous precursors, such as acetylene, using the nozzle input 68.

Solar Cell Manufacturing:

Achieving a viable product for harnessing solar energy requires a balancing between creating efficient cells and at the same time reducing the manufacturing cost. While conventional polycrystalline cells are efficient, thin film amorphous solar cells have proven to be cost effective on the basis of overall price per watt. Polycrystalline cells are made by ingot casting and slicing the wafers. Amorphous thin film cells are made with chemical Vapor Deposition process.

However, according to the principles of the present teachings, a unique process using direct current plasma apparatus 10 is provided that uses benign precursors (powders (Si), liquids ($ZnCl_2$, $InCl_3$ and $SnCl_4$), and gaseous (Silane) precursors) to achieve polycrystalline efficiency at thin film manufacturing cost. The proposed cells consist of multi-junction Si films with efficient back reflector and enhanced surface absorber (see FIG. 19). All the layers are deposited using direct current plasma apparatus 10 and microstructurally engineered using laser beam 50.

The principles of the present teachings are capable of achieving wafer grade efficiency at thin film manufacturing cost. Moreover, the plasma deposition process (deposition rate μm/sec) of the present teachings is much faster than thin film deposition (PECVD, deposition rate nm/min) processes. However, the inherent inter-droplet boundaries (FIG. 5) of conventional plasma sprayed deposits make them unsuitable for photovoltaic applications. By processing the deposited layer with laser source 50, wafer grade crystallinity can be achieved at a rapid rate. At the same time, the deposition process of the present teachings retains many of the attractive features of thin film technology i.e., multi-junction capability (see FIGS. 19 and 20) and low manufacturing cost. Furthermore, according to the present teachings, in-situ cell surface patterning using laser source 50 can enhance light absorption (see FIG. 15), which could not previously be achieved using other techniques, such as etching. Furthermore, according to these current teachings a multi-junction crystalline solar cell can be achieved which was not possible by the prior art of ingot casting.

In some embodiments, the method can comprise:

Step 1: An oxide (SnO2, InSnO2, or ZnO) coating is deposited on Al or conductive plate (bottom electrode). This layer serves as the reflective as well as conductive layer and is obtained directly from powder or liquid precursor (nanoscale) using direct current plasma apparatus 10. The microstructure is laser treated to optimize reflectivity as well as conductivity.

Step 2: Using suitable precursors, separate n-type, i-type and p-type doped semiconducting (Si) thin films are deposited on the oxide coating. The coating microstructure is optimized by the laser for maximum current output. Further, the surface of the p-type layer can be engineered by the laser source 50 to maximize the surface area for light trapping.

Step 3: An oxide (ZnO2, or InSnO2) coating is deposited on the p-layer. This layer serves as the transparent as well as the conductive layer and is obtained directly from powder or liquid precursor as in Step 1. The microstructure is laser treated to enhance transparency as well as conductivity.

Step 4: Finally the top electrode is deposited by plasma using powder precursor of a conductive metal. The entire process is carried out in an inert/low pressure environment in a sequential manner. Thus, large area cells with high efficiency can be manufactured cost effectively.

Fuel Cell Manufacturing:

Solid Oxide Fuel Cell (SOFC) manufacturing presents significant challenges due to the requirement of differential densities in the successive layers as well as thermal shock resistance. The anode and cathode layer of the SOFC need to be porous while the electrolyte layer needs to reach full density (see FIG. 21). Typically, SOFCs are produced using wet ceramic techniques and subsequent lengthy sintering processes. Alternatively, plasma spray deposition is also used to deposit the anode, electrolyte and the cathode followed by sintering for densification. While sintering reduces the porosity level in the electrolyte, it also leads to unwanted densification of the cathode and anode layer.

According to the principles of the present teachings, the direct current plasma apparatus 10 using laser source 50 can provide unique advantage to engineer the microstructure as needed As described herein, each layer of the SOFC can be deposited and custom tailored using laser source 50 to achieve a desired densification. Further, one can also use precursors in the form suspended particles of YSZ in a solution consisting of chemicals which when plasma pyrolized form nanoparticles of YSZ. Such a methodology can improve the deposition rate considerably in comparison to deposition using precursors comprised of suspended YSZ particles in a carrier liquid. Such coatings have a wide variety of applications in the aerospace and medical industries.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A direct current plasma apparatus comprising:

a housing;

a cathode disposed in said housing;

an annular channel generally disposed adjacent said cathode, said annular channel configured to fluidly transmit a plasma gas;

an anode positioned operably adjacent to said cathode to permit electrical communication therebetween sufficient to ignite a plasma jet within the plasma gas;

a precursor source containing a precursor material;

a precursor outlet line extending through at least a portion of said cathode, said precursor outlet line terminating at at least one opening, said at least one opening being offset from a tip of said cathode to generally prevent deposition of said precursor material at said tip of said cathode, wherein said plasma jet is capable of entraining, melting, and depositing at least some of said precursor materials upon a target.

2. The direct current plasma apparatus according to claim 1, wherein said at least one opening is offset upstream of said tip of said cathode and outside of said plasma jet.

3. The direct current plasma apparatus according to claim 1, wherein said at least one opening is offset downstream of said tip and extending beyond said tip and into said plasma jet.

4. The direct current plasma apparatus according to claim 1, further comprising:

a laser source outputting radiation energy upon the target after deposition of said at least some precursor materials.

5. The direct current plasma apparatus according to claim 4 wherein said laser source changes a densification of said at least some precursor materials deposited on said target.

6. The direct current plasma apparatus according to claim 1 wherein said precursor material comprises nanoparticles.

7. The direct current plasma apparatus according to claim 1 wherein said precursor material is a powder.

8. The direct current plasma apparatus according to claim 1 wherein said precursor material is a liquid.

9. The direct current plasma apparatus according to claim 1 wherein said precursor material is a gas.

10. The direct current plasma apparatus according to claim 1, further comprising:

a nozzle transmitting said plasma jet therethrough.

11. The direct current plasma apparatus according to claim 10 wherein said nozzle is circular, elliptical, or rectangular shaped.

12. A direct current plasma apparatus comprising:

a housing;

a cathode disposed in said housing;

an annular channel generally disposed adjacent said cathode, said annular channel configured to fluidly transmit a plasma gas;

an anode positioned operably adjacent to said cathode to permit electrical communication therebetween sufficient to ignite a plasma jet within the plasma gas;

a precursor source containing a precursor material;

a precursor outlet assembly having an opening, said opening is formed in said cathode at a position upstream of a tip of said cathode, said precursor outlet assembly receiving said precursor material from said precursor source and atomizing said precursor material together with a gas into said plasma jet, wherein said plasma jet is capable of entraining, melting, and depositing at least some of said precursor materials upon a target.

13. The direct current plasma apparatus according to claim 12, further comprising:

a laser source outputting radiation energy upon the target after deposition of said at least some precursor materials.

14. The direct current plasma apparatus according to claim 13 wherein said laser source changes a densification of said at least some precursor materials deposited on said target.

15. The direct current plasma apparatus according to claim 12 wherein said precursor material is a liquid.

16. The direct current plasma apparatus according to claim 12 wherein said precursor material is a gas.

* * * * *